United States Patent [19]

Markiel

[11] 3,999,778

[45] Dec. 28, 1976

[54] ADJUSTABLE WALKER ATTACHMENT FOR WHEEL CHAIRS

[76] Inventor: Henry Markiel, Idlewood Drive, W. E., Jamestown, N.Y. 14701

[22] Filed: Nov. 1, 1974

[21] Appl. No.: 519,940

[52] U.S. Cl. .......................... 280/289 WC; 297/5; 280/43

[51] Int. Cl.² .......................................... B60H 3/00

[58] Field of Search ................. 280/289, 150.5, 43; 272/70.3, 70.4; 297/5

[56] References Cited

UNITED STATES PATENTS

| | | | |
|---|---|---|---|
| 2,137,703 | 11/1938 | Seyferth | 280/150.5 |
| 3,398,974 | 8/1968 | Edwards et al. | 280/289 |
| 3,584,890 | 6/1971 | Presty | 280/289 |
| 3,708,182 | 1/1973 | Markiel | 280/289 |
| 3,782,749 | 1/1974 | Wiczer | 280/150.5 |

*Primary Examiner*—Kenneth H. Betts

[57] ABSTRACT

A walker for use with a wheel chair is disclosed. The walker has a generally U-shaped frame with a column swingably attached to the intermediate part of the U-shaped frame. A caster wheel is attached to the distal end of the column and a tube is swingably attached to the distal ends of the U-shaped frame. A pair of brackets are provided by attaching the front side of the wheel chair to the brackets. Each of the brackets has a telescoping pin. Clamps are provided on the tubular brackets which can be attached to the wheel chair and which receive the telescoping pins attached to the U-shaped frame.

6 Claims, 5 Drawing Figures

ADJUSTABLE WALKER ATTACHMENT FOR WHEEL CHAIRS

REFERENCE TO PRIOR ART

A walker generally of the type disclosed herein is shown in U.S. Pat. No. 3,708,182 issued to Henry Markiel on Jan. 2, 1973.

OBJECTS OF THE INVENTION

It is an object of the invention to provide an improved walker.

Another object of the invention is to provide an improved walker in combination with a wheel chair.

Another object of the invention is to provide an improved bracket and walker combination.

With the above and other objects in view, the present invention consists of the combination and arrangement of parts hereafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
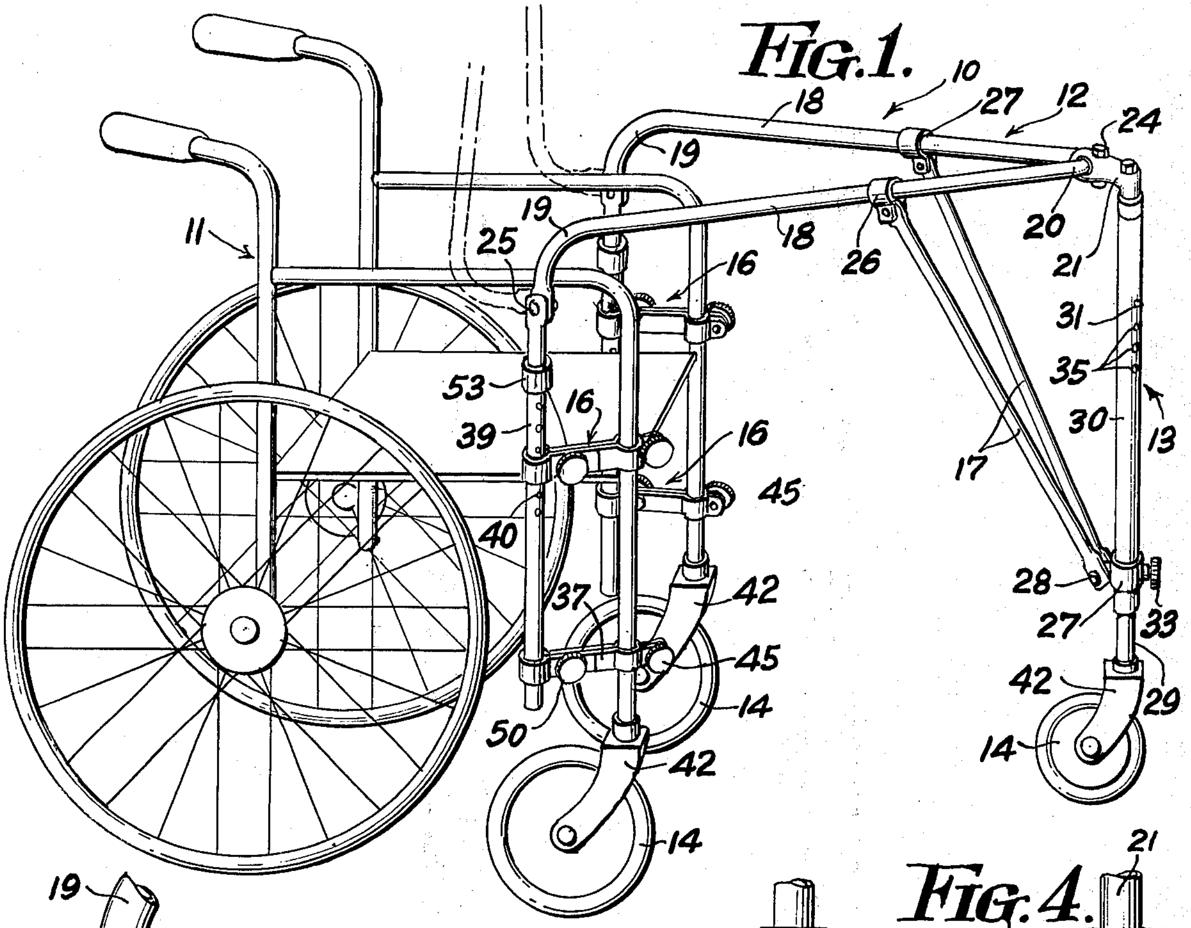
FIG. 1 is a side view of the walker according to the invention and attached to the wheel chair by means of a suitable bracket.
Figure 2:
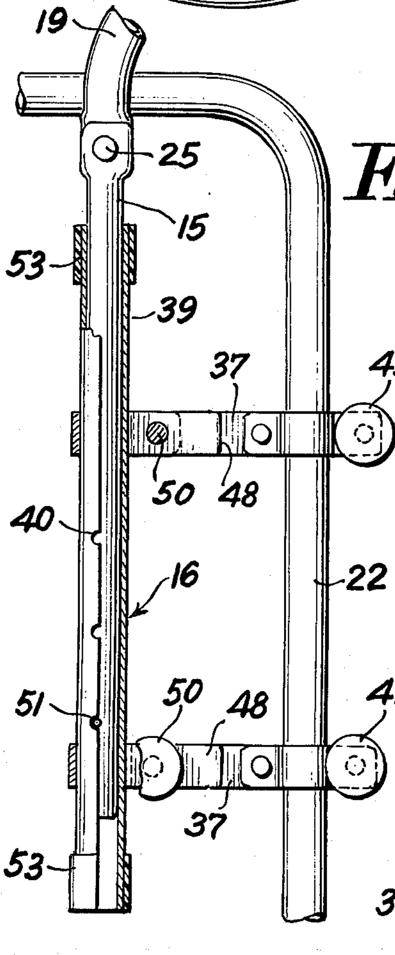
FIG. 2 is a partial enlarged cross sectional view of the bracket shown in FIG. 1.
Figure 5:
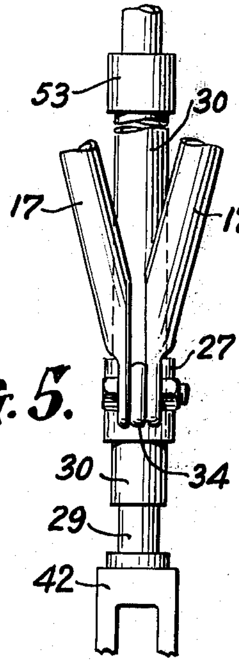
FIG. 5 is a side view similar to FIG. 4.
Figure 4:
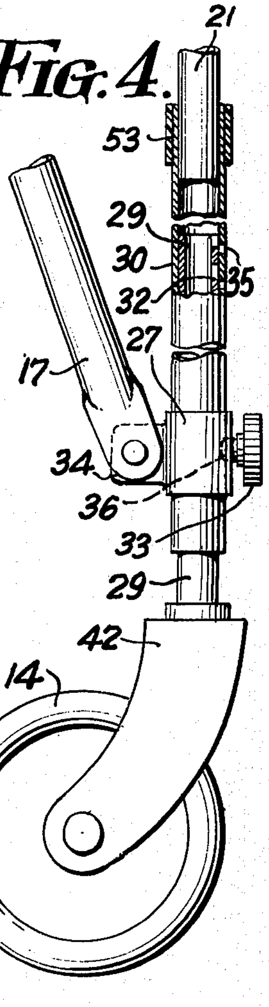
FIG. 4 is a side view partly in cross section of the bracket according to the invention.
Figure 3:
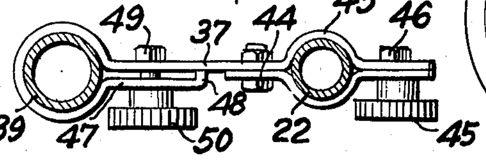
FIG. 3 is a bottom view of the bracket.

Now with more particular reference to the drawings, the walker 10 is shown attached to the wheel chair 11. The walker 10 is made up of a generally U-shaped frame 12 having spaced legs 18 and an intermediate part 20. A column 13 is swingably attached to the intermediate part 20 of the frame by means of the bracket 24 which is fixed to the upper end of the column 13 and has a sleeve that receives the round tubular frame member 20.

Caster wheel 14 is supported on the lower end of the column 13 and the distal ends 19 of the legs 18 are turned at right angles to the legs 18 and have the end members 15 swingably connected thereto at pivot 25. Downwardly forwardly and inwardly extending brace members 17 are swingably connected to a leg member 26 on each of the legs 18 by means of a pivot 28.

The column 13 is made up generally of the lower column tube 29 and the upper column tube 30. The lower column tube 29 is telescopically received in the upper column tube 30. The caster bracket 42 is supported on the lower end of the lower column tube 29 and bracket 42 supports wheel 14. The lower column sleeve 29 has a spring loaded detent 31 supported on it, and this detent selectively engages the spaced holes 35 in the upper column sleeve 30. Thus, the detent 31 can be depressed and moved out of one of the upper holes 35 to a lower hole 35, allowing column 29 to extend further, and the wheel 14 can thus be moved further down, thereby increasing the overall effective length of the column 13.

To change the effective length of column 13, the lower column tube 29 slides relative to the upper column tube 30 when the detent 31 is depressed, and the spring loaded pin 33 has to slide relative to the inner column sleeve 29. This is accomplished by the pin 33 extending through slot 32 in column 29. Pin 33 is supported on column tube 30 and engages hole 36 in the outer upper column sleeve 30 and projects through the slot 32. Thus, the lower column tube 29 can slide relative to the upper column sleeve 30 without retracting the pin 33. The bracket 34 is fixed to the sleeve 27. The sleeve 27 slides on the upper column tube 30 when the pin 33 is retracted from its hole 36, thus, enabling the column 13 to pivot on its bracket 21 on the U-shaped frame 12.

The bracket 21 is of a type similar to that found on some bicycle forks that hold the handle bars to the fork and is familiar to those skilled in the art. However, the stud 24 that normally clamps the handle bars to the bracket 21 is not tightened up sufficiently tight to prevent the bracket 21 from rotating relative to the frame 12. Rotation is prevented by the braces 17 that positively hold the column in position.

The brackets 16 are made up of clamp straps 37 that are adapted to be clamped to a tubular member 22 on a wheel chair. The tubular member 22 on the chair is clamped to the bracket 37 by the clamp member 43, which is held to the intermediate strap by means of a stud 44 and has its outer end clamped by the hand wheel 45, which connects to the stud 46. Thus, the clamp means 37 can be swung relative to the wheel chair member 22 by loosening the hand wheel 45. The lower bracket tube 39 is clamped to the strap member 37 by the end of the bracket member 47 which bends back on itself and encircles the bracket tube 39 and has its end 47 which terminates in an end portion 48. Then portion 48 rests on the member 37 and provides a resilient support urged by the stud 49 when the hand wheel 50 is tightened. Thus, the lower tubular member 39 can be frictionally held in clamped position by tightening the hand wheel 50.

The end members 15 are telescopically received in the lower bracket tube 39 and are held selectively in adjusted vertical position by the detents 51 supported in the end members. When a detent 51 is depressed, the end member can be slid upwardly or downwardly relative to the lower bracket tube 39 to bring detent 51 to a new hole 40, thereby adjusting the rearward vertical position of the legs 18 of the walker.

The plastic bumper members 53 are in the form of plastic sleeves which surround the ends of the several tubular members shown, thereby preventing them from damaging furniture and the like.

Leg 29 is fixed to sleeve 27 and sleeve 27 slidably and telescopically receives column tube 30. Sleeve 27 carries spring loaded pin 33 which engages hole 36 in the upper tube and slides freely in slot 32. Column 13 is pivoted to the braces 17 at 28. The length of the column 13 is adjustable since the lower tube 29 of the column is telescopically received in the upper tube and a detent member 31 in the inner member 29 selectively engages a plurality of spaced holes 35 in the front side of the tubular member 30 so that the detent can be pushed inwardly out of the particular hole 34 and the lower tube 29 can be pulled outward to adjust the length of the column 13. A spring loaded pin 33 is supported on the sleeve 27 and the pin 33 engages the hole 36 of the tubular member 30. Thus, the tubular member 27 can be slid downward along the tubular member 30 when pin 33 is pulled out of hole 36. Sleeve 27 will freely slide on tube 30, making it possible to swing the column 13 and wheel 14 upward into a position parallel with the legs 18. The entire walker can be swung up around the pivots 25 so that the legs 18 are in vertical position to enable the occupant of the chair to move out of the chair without removing the legs 18 from the brackets 16.

In mounting the walker attachment on a wheel chair, the bracket 37 will be attached to the tubular members 22 in front of the wheel chair in a vertical position so that the U-shaped frame 12 will swing upwardly and pass over the head of a person sitting in the wheel chair to the position shown in FIG. 1. The operator will then firmly tighten the large knobs 45 and the small knobs 50. When the walker attachment is not needed, the main U-frame 12 is removed by disconnecting the end members 15 from the tubular members 16. This is done by lifting the end members 15 out of the tubular members 39. The wheel 14, the U-shaped member 12 and the end members 15 will be a separate unit from the chair. The tube 16 can be swung around the chair member 22 to be out of the way from the rest of the chair.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a walker and a wheel chair having spaced vertically extending tubular bracket means attached thereto, a generally U-shaped frame member having spaced legs connected by an intermediate part, said legs terminating in end members disposed at right angles to said legs, a column member swingably connected to said intermediate part of said U-shaped frame member, a caster wheel attached to the lower end of said column member, means swingably connecting the distal end of said end members to said spaced legs, downwardly, inwardly and forwardly extending braces swingably attached at one end to said legs of said U-shaped member, a sleeve slidably received on said column member, said braces being connected to said sleeve, means to hold said sleeve against sliding on said column member.

2. The walker recited in claim 1 wherein said bracket means have spring loaded detent means thereon for engaging said end members on said U-shaped member whereby said walker is held in position on said brackets means.

3. The walker recited in claim 1 wherein said bracket means and end members comprise tubular members telescopically disposed relative to each other, and detent means supporting end members relative to said bracket means whereby the effective length of said end members can be adjusted.

4. The walker recited in claim 1 wherein said column comprises, an upper column tube and a lower column tube, said upper column tube being telescopically received in said lower column tube, said column member being swingably attached to said intermediate part of said U-shaped member by a bracket means fixed to the upper end of said upper column tube and rotatably supported on said U-shaped member.

5. The walker recited in claim 4 wherein a plurality of axially spaced holes are provided in said upper column tube, and detent means supported on said lower column tube and adapted to selectively engage one of said axially spaced holes in said upper column tube, whereby said upper column tube and said lower column tube can be held in selected axial relation to each other thereby providing adjustment for the overall length of the said column.

6. The walker recited in claim 5 including spring loaded pin means on said sleeve engaging a hole in said upper column tube and an axially extending slot in said lower column tube receiving said pin means whereby said lower column tube can be adjusted by depressing said detent in the upper end thereof from one of said spaced axial holes and allowing said pin means to slide in said axially extending slot.

* * * * *